Aug. 9, 1966  D. L. BURNER  3,265,431
PIPE TRANSFER ELEVATOR
Filed July 6, 1964  2 Sheets-Sheet 1

INVENTOR.
DONALD L. BURNER
BY
Robert K. Rhea
AGENT

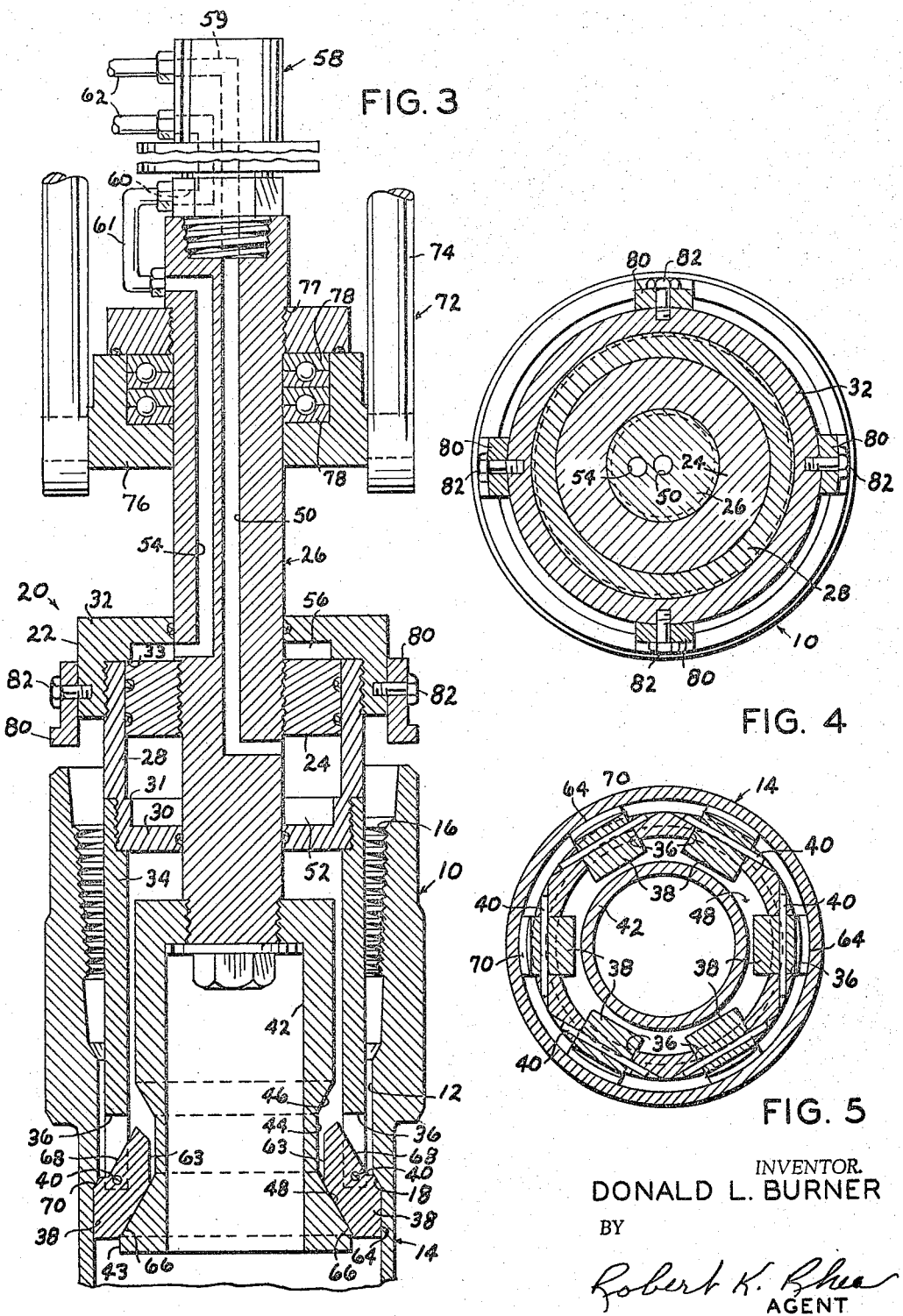

United States Patent Office 3,265,431
Patented August 9, 1966

3,265,431
PIPE TRANSFER ELEVATOR
Donald L. Burner, Norman, Okla., assignor to Acme Tool, Inc., Oklahoma City, Okla., a corporation of Kansas
Filed July 6, 1964, Ser. No. 380,332
2 Claims. (Cl. 294—86.25)

The present invention relates to well drilling and more particularly to a pipe tool for handling or moving "stands" of pipe used in boring "big holes." The term "big holes" as used herein refers to large diameter boreholes on the order of five feet or more in diameter in which the drill pipe used is more than one foot in diameter. The term "stand" as used herein refers to two or more joints of interconnected pipe which are stacked or positioned vertically within the confines of the pipe handling derrick, at one side of the floor thereof, when pulling the drill pipe to replace the drill bit.

The drill pipe is provided with collars or tool joints welded to the upwardly disposed end of each pipe joint. The wall thickness of these tool joints is substantially greater than the wall thickness of the pipe and forms an outer annular shoulder so that a pipe pulling or lifting elevator may surround the pipe and lift the latter by engagement with the shoulder in a conventional manner. Because of the relatively large diameter of the drill pipe and the limited available area on the derrick floor it is desirable to stack the drill pipe stands in as close proximity with each other as the diameter of the tool joints will permit. The dimensions of the lifting elevator will not permit such close stacking of the pipe.

It is, therefore, the principal object of this invention to provide an improved pipe transfer elevator or tool which is particularly adapted for engaging and lifting stands of large diameter drill pipe wherein retractable gripping elements are arranged to be expanded into engagement with the inside diameter of the pipe.

The above described tool joints, when connected with the above mentioned pipe joints, form an inwardly directed annular shoulder having an upwardly converging or tapered surface defining a smaller diameter for the tool joint than the inside diameter of the pipe.

It is, therefore, another important object to provide a transfer elevator or pipe lifting device arranged to grip the inside diameter of pipe and lift the latter by contact with the tapered annular shoulder.

Still another object is to provide a transfer elevator having a hydraulically operated piston and means connected with a piston rod for moving gripping elements from a retracted pipe entering position to a radially outwardly expanded pipe gripping position.

A further object is to provide a tool of this class which may be connected with elevator means and rotate independently of the elevator means.

A still further object is to provide a device of this class which will engage and lift stands of drill pipe and position the latter in close proximity without damage to the pipe.

Another object is to provide a tool for gripping the inner periphery of the upper end portion of drill pipe stands which features a means for positioning the tool coaxially within the drill pipe.

The present invention accomplishes these and other objects by providing a cylinder having a pressure operated piston movable therein and having a piston rod slidably projecting through opposing end walls of the cylinder. Pipe gripping elements are attached to the depending end of the cylinder with means for expanding and retracting the gripping elements by vertical movement of the piston rod.

Other objects will be apparent from the following description when taken in conjunction with the accompanying two sheets of drawings, wherein.

Figure 2:
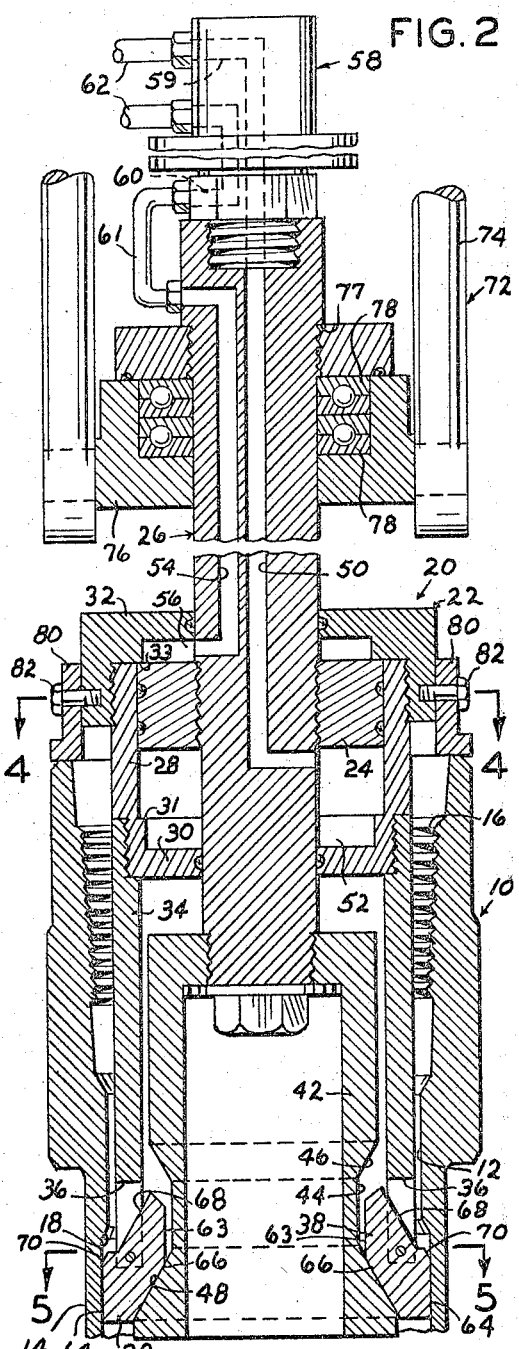
FIGURE 2 is a view similar to FIG. 1 illustrating the tool in pipe gripping position.

FIGURE 3 is a view similar to FIG. 2 illustrating the tool in pipe gripping and lifting position; and, FIGURES 4 and 5 are horizontal cross-sectional views taken substantially along the lines 4—4 and 5—5 of FIG. 2.

Like characters of reference designate like parts in those figures of the drawings in which they occur.

In the drawings:

The reference numeral 10 indicates a collar or tool joint having a bore 12 and connected to a joint of pipe 14, as is used in rotary drilling big holes. The tool joint 10 is internally threaded, as at 16, which engages cooperating threads on the depending end of an upper pipe joint, not shown. As mentioned hereinabove the thickened wall of the tool joint 10, with respect to the wall thickness of the pipe 14, forms an upwardly converging or tapered annular shoulder 18. The above description is conventional with pipe presently used in big hole drilling and is set forth to show the type of tubular members or drill pipe with which the present invention is designed to operate.

The reference numeral 20 indicates the device, as a whole, which is substantially cylindrical in general configuration comprising a cylindrical housing 22 containing a vertically movable piston 24 threadedly connected to a piston rod 26 intermediate the ends of the latter. The respective end portions of the piston rod 26 extend through the opposing end walls of the housing. The housing 22 comprises a cylinder 28 having a centrally bored lower end portion 30 surrounding the depending end portion of the piston rod and a centrally bored cap 32 threadedly connected coaxially to the upper end of the cylinder 28 around the piston rod 26. Annular shoulders 31 and 33 formed within the cylinder 28 and cap 32, respectively, limit the vertical movement of the piston 24 and define lower and upper fluid chambers 52 and 56, respectively.

A sleeve-like cage 34, diametrically equal to the diameter of the cylinder 28, is coaxially connected to the depending end of the cylinder 28. The outside diameter of the cylinder 28 and cage 34 is such that they may be freely received by the bore 12 of the tool joint 10. The depending end portion of the wall of the sleeve 34 is provided with a plurality of downwardly open vertical slots 36 for receiving a like plurality of dogs 38 pivotally connected within the respective slot 36 by pins 40.

A downwardly open cylindrical mandrel 42 is threadedly connected by its upper end portion to the depending end of the piston rod 26 within the cage 34. The depending end portion of the mandrel 42 extends downwardly beyond the depending end of the cage 34 and is circumferentially enlarged, as at 43. The periphery of the depending end portion of the mandrel is provided with a recess 44 for the reception of the dogs 38. The recess 44 is characterized by outwardly diverging upper and lower tapered or cone-shaped end surfaces 46 and 48, respectively, for the purposes more fully described hereinbelow.

The piston rod is centrally bored from its upper end to form a fluid passageway 50 which extends beyond the piston 24 and is open laterally through the piston rod for communication with the housing chamber 52 below the piston. The piston rod is further provided with an off-center bore 54 extending laterally inward from its upper end portion and logitudinally downward to a point adjacent the upper end surface of the piston 24 where it is turned laterally of the piston rod to communicate with the housing chamber 56 above the piston.

A conventional air or hydraulic pressure rotating union 58 is coaxially connected to the upper end portion of the piston rod 26. The union 58 has a central passageway 59 which communicates with the piston rod bore 50 and an off-set passageway 60 connected to the off-set piston rod bore 54 by a section of tubing 61 for the purposes of applying air or hydraulic fluid pressure to the housing chambers 52 and 56 from a suitable source, not shown, connected to the respective passageways of the union 58 by flexible hole 62, or the like. Thus the piston may be selectively moved up or down within the housing 20 to move the mandrel 42.

Figure 1:
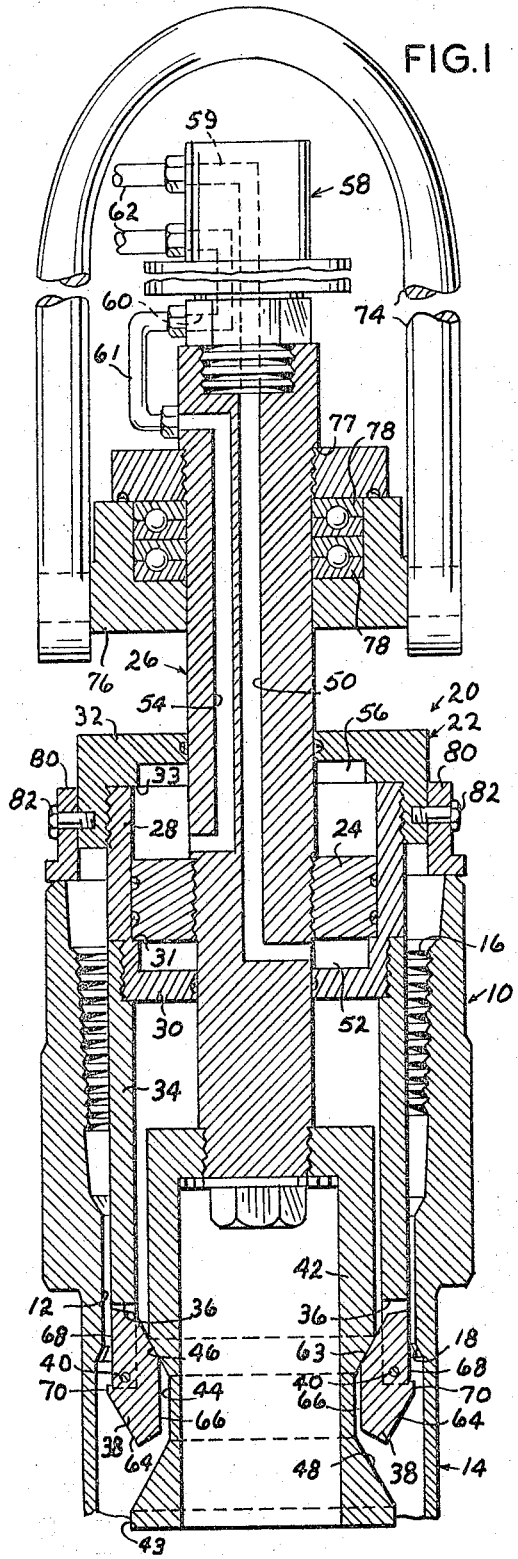
FIGURE 1 is a fragmentary vertical cross-sectional view of the tool in gripping element retracted position when positioned within a drill pipe collar.

The dogs 38 are polygonal-shaped when viewed in vertical cross section having two pairs of opposing substantially parallel surfaces 63–64 and 66–68. As seen in FIG. 1, the piston 24 is positioned at its lowermost limit within the housing 22 wherein the mandrel 42 is extended downwardly and the surface 63 of the dogs is contacted by the upper tapered or inverted cone-shaped end surface 46 of the mandrel recess 44 to pivot the dogs to a retracted position for entering or removal from the pipe.

Referring now to FIG. 2, the piston has been moved to the upper limit of its travel raising the mandrel 42 wherein the surface 66 of the dogs is contacted by the mandrel cone-shaped surface 48 to pivot the lower end portion of the dogs radially outward in an expanded position so that the surface 64 of the respective dog contacts a portion of the inner wall surface of the pipe. As shown in FIG. 5, the surface 64 of the dogs 38 is formed on a radius which cooperatively contiguously contacts the inner wall surface of the pipe 14. Upward movement of the mandrel 42 with respect to the cage 34 and dogs 38 inparts a wedging force to the dogs 38 by the cone-shaped surface 48 forcing the dog surfaces 64 against the inner wall of the pipe 14.

As shown in FIG. 3, upward movement of the entire device 20 positions the dogs 38 in contact with the annular shoulder 18 which is cooperatingly engaged by a similarly tapered surface 70 formed on the respective dog intersecting the pipe engaging surface 64. The device is lifted by means of an elevator 72 having a bail 74 connected with the wire line operated traveling block of a drilling rig, neither of which are shown, in a conventional manner. The bail 74 is connected to an elevator body portion 76 which coaxially surrounds the upper end portion of the piston rod 26 below an annular shoulder and includes antifriction bearings 78 so that the piston rod 26 may rotate freely about its vertical axis independently of the elevator body 76.

Stops 80 are connected to the periphery of the cap 32 in circumferentially spaced relation by pins 82 to contact the upper end edge of the tool joint 10 and limit the movement of the device 20 into the tool joint.

Removal of the device from the tool joint after lifting the stand is accomplished by lowering the device within the tool joint until the stops 80 contact the upper end surface thereof and then lowering the piston 24. This lowers the mandrel 42 and pivots the dogs radially inward to a retracted position as explained hereinabove.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A pipe transfer tool for lifting and moving a vertically disposed joint of pipe having an upwardly open end, including: a vertically disposed cylinder freely received by the open end of said pipe; a piston within said cylinder; a piston rod connected with said piston and extending vertically slidable through the respective ends of said cylinder, the upper end portion of said piston rod having a pair of bores extending downward from its upper end portion and communicating at their lower ends with the interior of said cylinder on opposing upper and lower end surfaces of said piston; a cage coaxially connected in depending relation to the lower end portion of said cylinder, said cage having a plurality of vertical slots in its depending end portion; gripping means connected to the depending end of said cage; a mandrel connected to the depending end of said piston rod within said cage, said mandrel having tapered surfaces slidably contacting said gripping means and coacting with the latter in response to vertical movement of the mandrel with respect to said cage for moving said gripping means into and out of contact with the inner wall of said pipe, said gripping means comprising a pipe gripping dog pivotally connected to said cage within each said slot, said dogs having opposing surfaces slidable on the tapered surfaces of said mandrel; and means connected with the upper end of said piston rod for moving said piston and lifting said pipe, said last mentioned means comprising, pressure conducting means connected with the upper end of said piston rod and communicating with the pair of bores in the latter, and an elevator connected with the upper end portion of said piston rod.

2. Structure as specified in claim 1 and stops secured to the upper end portion of said cylinder and engageable with the upper end surface of said pipe for limiting movement of said cylinder into said pipe.

References Cited by the Examiner

UNITED STATES PATENTS 604,973    5/1898    Dinkey _____ 294—95

FOREIGN PATENTS 920,155    3/1963    Great Britain.

HUGO O. SCHULZ, *Primary Examiner.*